Sept. 18, 1962  C. T. PIEROTTI  3,054,619
STUFFING BOX
Filed Feb. 8, 1960
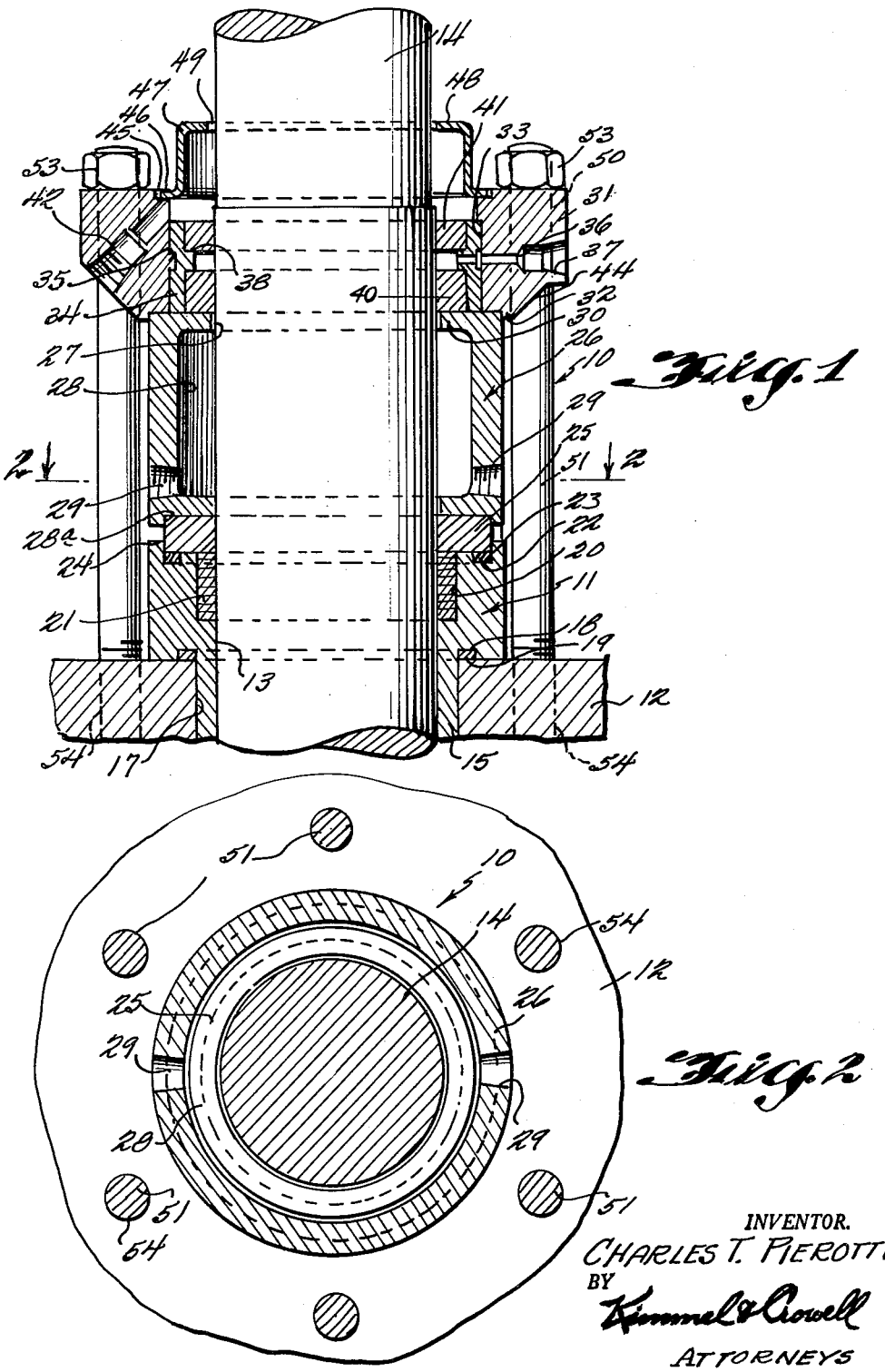
INVENTOR.
CHARLES T. PIEROTTI
BY
Kimmel & Crowell
ATTORNEYS though the packing and out of the top of the stuffing box, as has hitherto been the case with conventional stuffing boxes employed for this purpose.

3,054,619
STUFFING BOX
Charles Thomas Pierotti, Corry, Pa., assignor to Ajax Iron Works, Corry, Pa.
Filed Feb. 8, 1960, Ser. No. 7,290
4 Claims. (Cl. 277—59)

This invention relates to a stuffing box, and more particularly to a stuffing box arrangement adapted for use with a reciprocating shaft, such, for example, as is employed in a reciprocating pump construction, or the like.

A primary object of this invention is the provision of an improved stuffing box provided with means to prevent the passage and consequent splashing of the fluid slippage which passes by the packing and out of the top of the stuffing box, as has hitherto been the case with conventional stuffing boxes employed for this purpose.

An additional object of this invention is the elimination of small closely machined parts common to all conventional stuffing boxes. Also by the elimination of these small parts which must fit closely to the plunger and stuffing box bore, the invention greatly simplifies and reduces the time required to overhaul or repack a plunger or rod.

Of further importance in this invention is the introduction of a stuffing box arrangement which is segmented into a number of parts which are interchangeable through a wide range of plunger sizes, thus keeping conversion cost when changing sizes of plunger down to a bare minimum.

A further important object of the invention is the provision of a stuffing box of this character which is held in related assembly solely by studs or bolts so that the same may be readily disassembled for replacement of worn or damaged parts with a minimum of effort and difficulty.

An additional advantage of the segmented arrangement allows solid ring-type packing to be changed without removal of the plunger from the bore.

Still another object of the invention is the provision of a stuffing box of this character which is sturdy and durable in construction, reliable and efficient in operation, and relatively simple and inexpensive to manufacture, assemble and utilize.

Other objects will in part be obvious, and in part be pointed out as the description of the invention proceeds.

Still other objects reside in the combinations of elements, arrangements of parts, and features of construction, all as will be more fully pointed out hereinafter and shown in the accompanying drawing wherein:

FIGURE 1 is a vertical longitudinal sectional view taken through one form of stuffing box embodying elements of the instant invention; and FIGURE 2 is a sectional view taken substantially along the line 2—2 of FIGURE 1, as viewed in the direction indicated by the arrows.

Similar reference characters refer to similar parts throughout the several views of the drawing.

Having reference now to the drawing in detail, a stuffing box of the instant invention, generally indicated at 10, includes a lower bushing or annulus 11 which is adapted to seat on a base plate 12, which latter may comprise an integral portion of the cylinder or fluid chamber. The bushing 11 is provided with a central aperture 13, through which a plunger, shaft, or rod 14 extends. The plunger 14 is adapted to be reciprocated in the conventional manner.

Bushing 11 has a depending integral pilot 15, which fits into a central bore or opening 17 in base plate 12, and is provided at the juncture of pilot 15 with the main body portions with a groove or channel 18, which contains an O ring or gasket 19, for sealing purposes. A channel 20 is positioned in the body portion of bushing 11 and is adapted to contain a packing 21, while the top of the body 11 is provided with a second groove or channel 22 containing a gasket 23. A flange or shoulder 24 extends around the top of bushing 11 and provides a seat for a gland or aligning ring 25.

A slippage chamber or collection ring 26 has a central opening 27 through which the shaft 14 passes, and is provided at its bottom with a counterbore 28[a] which defines its location in relation to alignment ring 25. Interiorly, the ring 26 is provided with a relatively large annular recess or chamber 28, which provides space for the collection of fluid slippage which passes by the packing on the pressure stroke of the reciprocating plunger 14. Interiorly threaded drainage openings 29 are provided at the lower portion of recess 28, and these permit the slippage to drain off without splashing out of the top of the stuffing box.

The top of annular recess 28 is closed by a flange 30 on the collection ring 26. The flange 30 and the upper surface of ring 26 provide a seat for a circular top plate 31, a counterbore 32 in the lower face of plate 31 seating over the edge of ring 26. Top plate 31 is provided with a relatively large central bore 33, within which is positioned a fluid seal retaining ring 34. Ring 34 is provided with a circumferential lubricant receiving channel 35 in its outer surface, the channel being in communication with an opening 36 which extends from a conventional pipe tap 37 in the outer wall of the ring. An internal flange 38 is provided adjacent the groove 35, and serves to confine a fluid sealing ring 40, which is positioned beneath the flange 38 and seats on the flange 30 and serves also as a seat for a fluid sealing ring 41. One or more drainage openings 42 are inclined angularly downwardly from the space above packing ring 40 to the inclined underside 44 of plate 31.

A counterbore 45 is formed in the outer surface of plate 31 and provides a seat for a peripheral flange 46 of a splash guard 47, the latter also having an inwardly turned flange 48 with a central opening 49 through which the plunger, rod, or shaft 14 extends.

A plurality of bolt openings 50 are arranged in a circle and extend through plate 31, and holding studs 51 are extended through these openings exteriorly of chamber 26 and bushing 11. Studs 51 are provided at their upper extremities with clamping nuts 53, and at their lower extremities are threadedly engaged in threaded bores 54 in alignment with the openings 50, in plate 12.

It will be seen that any fluid passing along the plunger 14 during the reciprocation of same is, in the main, retained in chamber 28, and drained off through the opening 29, while any remaining water which passes above seal 41 may be drained off through the drainage opening 42.

The stuffing box of the instant invention may be employed with a variety of sizes of plungers, since the bushing 15, ring 25 and fluid sealing rings 40 and 41 may be replaced by other parts of a different size, as may the packing rings 21. Similarly, a larger or smaller collection ring 26 may be provided as desired.

From the foregoing, it will now be seen that there is herein provided an improved stuffing box which accomplishes all of the objects of this invention, and others, including many advantages of great practical utility and commercial importance, including relative replacement or substitution of parts, which may be readily accomplished by merely removing the nuts 53, and disassembling the plate 31 from its associated bolts, thus providing access to any of the other component parts.

As many embodiments may be made of this inventive concept, and as many modifications may be made in the embodiment hereinbefore shown and described, it is to

I claim:

1. In a segmented stuffing box, the combination of an apertured base plate through which a plunger is adapted to extend, a lower bushing seated on said base plate, said lower bushing having a channel therein, packing in said channel, an aligning ring seated on said lower bushing, a collection ring having an internal annular recess and drainage openings communicating with said annular recess seated on said aligning ring, a top plate seated on said collection ring having a central bore and circumferentially spaced bolt openings about the periphery thereof, a fluid seal retaining ring in said central bore, and clamping bolts extended through said bolt openings and threadedly engaged in said base plate, said fluid seal retaining ring in said central opening having two spaced fluid seals therein, and a lubricant opening communicating with the space between said fluid seals, said top plate having a downwardly inclined drainage opening communicating with said central bore, and a splash guard overlying said central bore and adapted to surround said plunger.

2. In a segmented stuffing box, the combination of an apertured base plate through which a plunger is adapted to extend, a lower bushing seated on said base plate having an annular channel formed along its bore, a packing in said channel, an aligning ring seated on said lower bushing and said packing, a collection ring having an internal annular recess surrounding the plunger and drainage openings communicating with said annular recess seated on said aligning ring, a top plate seated on said aligning ring having a central bore, a radial bore communicating with the central bore and circumferentially spaced bolt openings about the periphery thereof, a fluid seal retaining ring with said central bore having an internal shoulder and a radial bore aligned with the radial bore in the top plate to form a lubricant passage, and a pair of sealing rings positioned around the plunger within the fluid seal retaining ring abutting the internal flange and on the opposite sides of the radial bore through the latter.

3. A fluid seal assembly comprising a plate having a central bore for passage of a shaft, a retaining ring arranged in said bore, said retaining ring including a circumferential abutment formed on its inner wall intermediate the edges of said ring, a pair of seals, one on each side of said abutment, said plate and ring being formed with communicating lubricant passages leading to the space between said seals.

4. The structure of claim 3 further including a splash guard fitted against the upper surface of said plate, said splash guard having an upstruck portion having an opening axially aligned with said ring, and said plate being formed with a downwardly inclined drainage opening communicating with the space under said splash guard.

References Cited in the file of this patent

UNITED STATES PATENTS

| | | |
|---|---|---|
| 1,507,428 | Rottel | Sept. 2, 1924 |
| 1,766,706 | Dorer et al. | June 24, 1930 |
| 2,721,748 | Tremolada | Oct. 25, 1955 |